Dec. 3, 1957 R. K. HOWIE 2,815,230
REMOVABLE SECURING MEANS FOR DIAL INDICATOR KNOBS
Filed Nov. 2, 1953
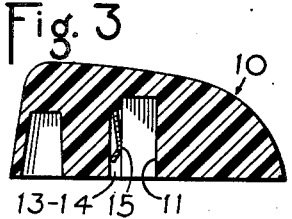
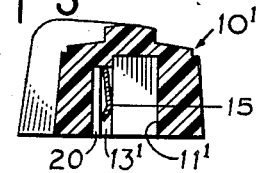
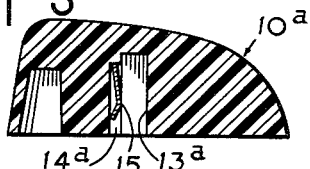
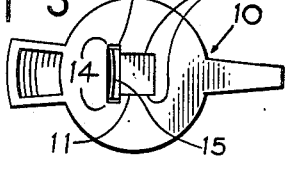
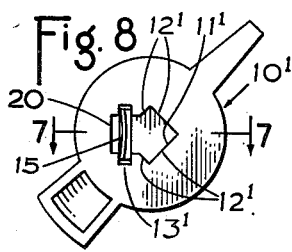
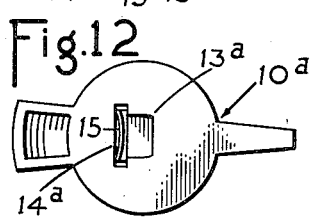
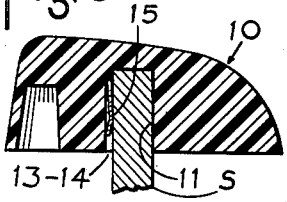
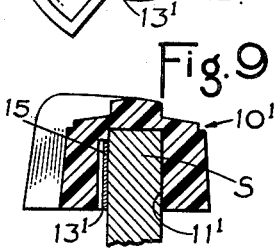
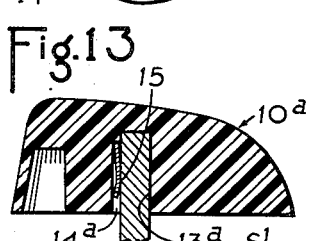
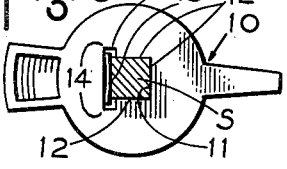
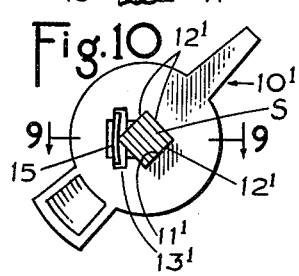
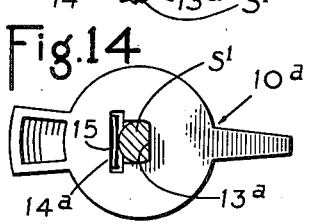
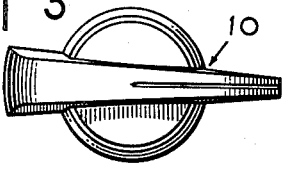
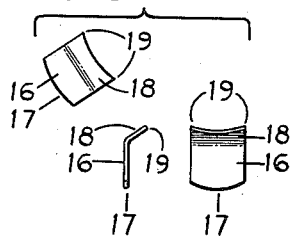
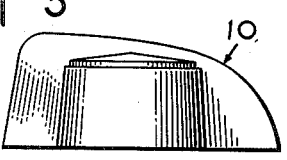
ROBERT K. HOWIE
INVENTOR.
BY *G. Lorenze Miller*
ATTORNEY

United States Patent Office 2,815,230
Patented Dec. 3, 1957

2,815,230

REMOVABLE SECURING MEANS FOR DIAL INDICATOR KNOBS

Robert K. Howie, Decatur, Ill., assignor to The Grigoleit Co., Decatur, Ill.

Application November 2, 1953, Serial No. 389,747

1 Claim. (Cl. 287—53)

This invention relates to removable securing means for dial indicator knobs.

The invention is more particularly concerned with dial indicator knobs having recesses therein for receiving the stems of various types of equipment and a primary object of the invention is to extend the said recesses in the provision of secondary recesses for removably accommodating plate spring members adapted to frictionally engage the said stems when the knobs are press fitted on the ends thereof.

A further object of the invention is to provide a dial indicator knob with a stem receiving recess together with a supplemental recess opening into the first recess and which supplemental recess is provided with opposed channel guides for opposite edges of a generally rectangular spring whose body portion is opposed to said first recess for frictional engagement with a stem disposed therein.

Other objects and advantages of the invention will become apparent in the course of the following detailed description, taken in connection with the accompanying drawing, wherein—

Fig. 1 is a side elevational view of a knob with which the present invention is operatively associated.

Fig. 2 is a top plan view of the knob illustrated in Fig. 1.

Fig. 3 is a verical longitudinal sectional view of the knob shown in Figs. 1 and 2.

Fig. 4 is a bottom plan view of the knob shown in Figs. 1, 2 and 3.

Fig. 5 is a sectional view corresponding to Fig 3 but with the knob mounted on a stem shown in axial section.

Fig. 6 is a view corresponding to Fig. 4 but showing a stem in transverse section.

Fig. 7 is a vertical sectional view in the plane of line 7—7 on Fig. 8 and illustrating a different form of recess in the knob.

Fig. 8 is a bottom plan view of the knob shown in Fig. 7.

Fig. 9 is a view corresponding to Fig. 7 and is a section on line 9—9 on Fig. 10 and wherein a stem is shown in axial section.

Fig. 10 is a view corresponding to Fig. 8 but showing the stem of Fig. 9 in transverse section.

Fig. 11 is a longitudinal vertical section of a knob provided with a still further form of recess.

Fig. 12 is a bottom plan view of the knob shown in Fig. 11.

Fig. 13 is a view corresponding to Fig. 11 but wherein the knob is mounted on a stem shown in axial section.

Fig. 14 is a bottom plan view of the knob shown in Fig. 13 with the stem in transverse section.

Fig. 15 is a bottom plan view of a knob provided with a still different form of recess.

Fig. 16 is a view of the plate spring friction member and illustrates the member from left to right in front plan, edge view and rear plan.

Referring now in detail to the drawing and first to Figs. 1 to 6 thereof, 10 designates a knob which is generally of the form now in use on the stems of various types of equipment.

The knob 10 is provided with a stem receiving recess 11 which opens through the bottom face thereof and which is bounded by three right angularly disposed walls 12 for confining a rectangular stem to rotation with the knob.

The knob is provided with a supplemental recess 13 which communicates with the recess 11 and the supplemental recess is wider than the recess 11 in the provision of opposed guide channels 14.

A yieldable friction member 15 is disposed within the supplemental recess 13 with its opposite edge portions disposed in said guide channels 14.

The said friction member is of such specific construction that its frictional engagement with the knob will exceed its frictional engagement with the stem whereby it will remain with the knob upon manual retraction of same from the stem.

The friction member embodies a plane body portion 16 having a convex outer edge 17 and a foot portion 18 in angular relation to the body portion 16 and being outwardly concave in the provision of opposed knob gripping points 19.

With the friction member disposed within the channels 14, the body and foot portions 16 and 18 are tensioned with a resulting biting of the points 19 into the material of the knob which as indicated is preferably formed of plastic.

As indicated more particularly in Figs. 3 and 5, the hump defined by portions 16 and 18 will normally project within the transverse area occupied by the stem S whereby the friction member will be substantially compressed upon entry of the outer end of the stem within the recess 11 with a resulting reaction which frictionally retains the knob on the stem. The friction between the stem and friction member however, will be less than that between the knob and friction member whereby the latter will always retain its operative position within the knob.

Referring now to Figs. 7 to 10, it will be observed that the knob $10^1$ is provided with a stem receiving recess $11^1$ which is of angular form but the walls $12^1$ of the angular recess are obliquely disposed whereby a corner of the stem S will enter the supplemental recess $13^1$ rather than a flat side thereof, as shown in Figs. 1 to 6.

In this form of the invention, the supplemental recess $13^1$ is extended inwardly as at 20 to provide for proper deflection of the friction member 15 when engaged by a corner of the stem S.

The structure shown in Figs. 11 to 14 is quite similar to that of Figs. 1 to 6 and wherein the knob $10^a$ is provided with a generally rectangular stem receiving recess $13^a$ which opens into a supplemental recess $14^a$.

In this form of the invention however, the stem $S^1$ is provided with a convex side which engages the friction member 15.

According to the embodiment of Fig. 15 the knob $10^b$ is provided with a rectangular stem receiving recess $13^b$ and a supplemental recess $14^b$ and the stem $S^{11}$ is provided with opposed convex edges whereby the knob may be placed on the stem in two different positions.

From the above description of the several forms of the invention, it will be seen that the common novel feature resides in a dial indicator knob having a stem receiving recess, and a supplemental recess opening into the stem receiving recess and in which a resilient friction member is retained in a position to frictionally grip the stem for removably holding the knob thereon.

While I have disclosed my invention in accordance with a single specific structural embodiment thereof, such is to be considered as illustrative only, and not restrictive, the scope of the invention being defined in the sub-joined claim.

What I claim and desire to secure by U. S. Letters Patent is:

A dial indicator knob having a cavity in the lower face thereof for receiving the end portion of a stem, said cavity being large enough to receive the stem and a yieldable friction member disposed completely within the cavity of the knob between the surface of the stem and the surface in the cavity of the knob, said yieldable friction member having a plane body portion, said body portion having one end convex and a smaller angular disposed foot portion which jointly provides a hump for extending into the cavity and in contact with the stem, said foot portion of said friction member having its outer end inwardly concave thus providing opposite points for biting into the material of the knob cavity, the convex end of the body portion having a single point of contact with the wall surface of the cavity in the knob.

References Cited in the file of this patent

UNITED STATES PATENTS

| | | |
|---|---|---|
| 1,903,457 | Holstein | Apr. 11, 1933 |
| 2,149,746 | Pfeiffer | Mar. 7, 1939 |
| 2,670,227 | Green | Feb. 23, 1954 |

FOREIGN PATENTS

| | | |
|---|---|---|
| 652,978 | Great Britain | May 2, 1951 |